(12) United States Patent
Giampavolo et al.

(10) Patent No.: US 10,363,951 B2
(45) Date of Patent: Jul. 30, 2019

(54) CHILD RESTRAINT FOR CHILD SEAT

(71) Applicant: SAFE-STRAP COMPANY, LLC, Fort Myers, FL (US)

(72) Inventors: Paul Giampavolo, Newton, NJ (US); Christopher Johnson, Glen Allen, VA (US)

(73) Assignee: Safe-Strap Company, LLC, Fort Myers, FL (US)

( * ) Notice: Subject to any disclaimer, the term of this patent is extended or adjusted under 35 U.S.C. 154(b) by 0 days.

(21) Appl. No.: 15/181,168

(22) Filed: Jun. 13, 2016

(65) Prior Publication Data

US 2017/0021849 A1    Jan. 26, 2017

Related U.S. Application Data

(60) Provisional application No. 62/174,433, filed on Jun. 11, 2015.

(51) Int. Cl.
*B62B 3/14* (2006.01)
*B62B 9/24* (2006.01)
*A47D 13/08* (2006.01)
*A47D 15/00* (2006.01)

(52) U.S. Cl.
CPC ............ *B62B 3/1452* (2013.01); *A47D 13/08* (2013.01); *A47D 15/006* (2013.01); *B62B 9/24* (2013.01)

(58) Field of Classification Search
CPC . B60R 2021/0055; B62B 3/1452; B62B 9/24; A47D 13/08; A47D 15/006
See application file for complete search history.

(56) References Cited

U.S. PATENT DOCUMENTS

| | | |
|---|---|---|
| 821,388 A | 5/1906 | Unger |
| 1,025,953 A | 5/1912 | Hallen |
| 1,253,241 A | 1/1918 | Haussinger |
| 1,259,604 A | 3/1918 | Cook |
| 1,407,408 A | 2/1922 | Allen |
| 1,486,813 A | 3/1924 | Atlee |
| 2,084,448 A | 6/1937 | Merchant |
| 2,592,879 A | 4/1952 | Eyerly |
| 2,664,150 A | 12/1953 | Strot |
| 2,755,101 A | 7/1956 | Budde |
| 2,860,886 A | 11/1958 | Schweitzer |

(Continued)

FOREIGN PATENT DOCUMENTS

| | | |
|---|---|---|
| EP | 0133235 | 2/1985 |
| GB | 2282572 | 4/1995 |

*Primary Examiner* — Timothy J Brindley
(74) *Attorney, Agent, or Firm* — West Hill Technology Counsel

(57) ABSTRACT

A child restraint for a child seat is relatively easily engaged using a passive approach and resists disengagement until released. A cross bar can be moved along a slide mechanism in the restraint, where the cross bar or the slide mechanism may include a ratchet mechanism. The ratchet mechanism may operate to permit the cross bar to be moved with relative ease in a first direction, and resist movement of the cross bar in a second, different direction. The cross bar in a lowered position contributes to restraining the child in the child seat by limiting leg movement. A release mechanism is actuated to release the cross bar to permit relatively easy movement. A locking mechanism may be employed to lock the cross bar in place.

19 Claims, 4 Drawing Sheets

(56) References Cited

U.S. PATENT DOCUMENTS

| | | | |
|---|---|---|---|
| 3,185,521 A | 5/1965 | Waldo | |
| 3,409,326 A | 11/1968 | Kerner | |
| 3,845,892 A | 11/1974 | Bernhardt, Jr. | |
| 4,280,731 A | 7/1981 | Pitts | |
| 4,403,807 A | 9/1983 | Wilkinson | |
| 4,451,084 A * | 5/1984 | Seeley | A47C 7/402 |
| | | | 248/297.31 |
| 4,819,988 A | 4/1989 | Hellstrom | |
| 4,867,484 A | 9/1989 | Cook | |
| 5,011,189 A | 4/1991 | Henderson | |
| 5,086,980 A | 2/1992 | Schweitzer | |
| 5,129,478 A | 7/1992 | Suenaga | |
| 5,203,612 A | 4/1993 | Pokrzywinski | |
| 5,203,613 A | 4/1993 | Ward | |
| 5,207,481 A | 5/1993 | Ayala | |
| 5,334,099 A | 8/1994 | Marra | |
| 5,533,786 A | 7/1996 | Cone, II | |
| 5,547,250 A | 8/1996 | Childers | |
| 5,636,818 A | 6/1997 | Edwards | |
| 5,651,557 A | 7/1997 | De Stefano | |
| 6,089,653 A | 7/2000 | Hotaling | |
| 6,513,441 B1 | 2/2003 | Clerx | |
| 6,595,590 B2 | 7/2003 | Bottoms | |
| 6,832,787 B1 | 12/2004 | Giampavolo | |
| 7,275,790 B2 * | 10/2007 | Chi | A47C 7/402 |
| | | | 297/353 |
| 7,887,087 B2 | 2/2011 | Sandvik | |
| 9,187,112 B2 | 11/2015 | Morford | |
| 9,573,612 B2 | 2/2017 | Morford | |
| 9,585,483 B2 * | 3/2017 | Wu | A47C 7/38 |
| 2005/0156394 A1 * | 7/2005 | Sandvik | B62B 3/144 |
| | | | 280/33.993 |
| 2008/0309139 A1 * | 12/2008 | Oda | A47C 1/036 |
| | | | 297/410 |
| 2013/0300169 A1 * | 11/2013 | Lu | A47D 1/103 |
| | | | 297/250.1 |
| 2014/0300156 A1 * | 10/2014 | Morford | B62B 3/1452 |
| | | | 297/256.17 |
| 2015/0246629 A1 * | 9/2015 | Bohm | B60N 2/2851 |
| | | | 297/256.15 |
| 2016/0046311 A1 * | 2/2016 | Morford | B62B 3/1452 |
| | | | 297/466 |

\* cited by examiner

CHILD RESTRAINT FOR CHILD SEAT

STATEMENT REGARDING FEDERALLY SPONSORED RESEARCH OR DEVELOPMENT (Not Applicable)

BACKGROUND

Child restraints have been used for child seats in different forms and applications. Regarding a shopping cart, a child restraint may be provided for a child seat that is formed as part of the shopping cart. The child seat may have certain design criteria that the child seat may be adapted to. For example, a child seat in a shopping cart may be formed with a collapsible seat bottom and back, to permit the seat to be collapsed when not in use. The seat may also be collapsed to permit the shopping cart to nest with another shopping cart for storage or handling.

It is generally desirable to provide a child restraint for a child seat to secure the child in the seat. Securing the child in a child seat with a restraint contributes to addressing issues such as safety, retention and reduced burden for a caregiver. With respect to shopping carts, safety is a primary issue, since the child seat of a shopping cart is elevated above a typically hard and unyielding floor. Unrestrained children can fall from such seats and risk serious injury or death.

Seatbelts have been used as restraints where a child is placed in the shopping cart seat and the seatbelt is then clasped around the child. Seatbelts generally are clasped around the waist of the child to secure them using the back of the shopping cart seat for anchorage. Other shopping cart child seat restraints have been developed, including the devices illustrated in U.S. Pat. Nos. 6,832,767 and 7,887,067. Some restraints have been used that are resistant to actuation by a child.

In cases where the seatbelts described above are used in an environment where they are typically subjected to high impact and compression forces, damage to the seatbelt components can result. A typical application for the above-described seatbelts is as child safety restraints on shopping carts. When shopping carts are nested together with one another for storing or handling large numbers of carts easily, for example, portions of the seatbelts can be caught between the carts and can be subjected to high impact and compressive forces. Impact forces like these tend to cause damage to seatbelt components, such as by causing the buckle to crack or even shatter. Compressive forces can damage the seatbelt components, such as by causing the buckle to deform beyond a point of elastic resilience, resulting in an unworkable buckle. In addition, the forces applied to the buckle may disrupt certain features, such as child resistance. Sometimes, a caregiver may feel challenged to secure a child in the shopping cart seat if the seatbelt is damaged or if the buckle is inoperative.

SUMMARY

A child restraint for a child seat is relatively easily engaged and relatively difficult to release. The restraint may include a cross bar that can be moved to a number of different positions, where some of the positions contribute to restraining a child in a child seat, and some of the positions permit easy entry to and/or exit from the seat for the child. The restraint may include a retaining mechanism, such as a ratchet, detent or latch mechanism, that operates to retain the restraint in a particular position. The retaining mechanism may operate to permit the cross bar to be moved with relative ease in a first direction, and may operate to resist movement of the cross bar in a second, different direction. In operation, the cross bar can be brought into proximity with a seat portion of a child seat, for example near the thigh of a child sitting in the child seat, to contribute to restraining the child in the child seat. The cross bar can be moved to be distal from the seat portion of the child seat, for example away from the thigh of the child, to permit entry and/or exit of the child to/from the child seat.

A release mechanism may implemented to release the retaining mechanism so that upon actuation of the release mechanism the cross bar can be moved with relative ease in different directions, for example to enlarge or reduce a child seat area that receives a leg of a child. The release mechanism may be child resistant, such as by being provided with an at least two-step actuation or by resisting actuation until a threshold level of force is applied, which level of force may be set to be difficult for a child to generate. The applied force may be in the form of a pinching force, which may be generated with two different forces that are directed in generally opposing directions.

The restraint may be attached to a child seat, which may be located in a child transport device, for example. The child seat may include an upright structure that is located between the legs of the child to contribute to maintaining the child in the child seat. The restraint may be attached to the upright structure, or to a portion of the child seat, or to a device hosting the child seat, such as a stroller or shopping cart. The restraint is attached at a location to permit interaction with the legs of the child. The restraint may thus be located near a front of the child seat and/or positioned above a seat bottom of the child seat. For example, the restraint may be located near a front edge of the child seat to permit the restraint to interact with one or more legs of the child in the child seat. The restraint may be rigidly and/or removeably attached or fastened in a location that permits the restraint to be positioned in proximity to a leg of the child in the child seat.

In an example implementation, the restraint can be fastened to a portion of a shopping cart that has a child seat, near the legs of the child. In particular, the restraint can be fastened to an upright structure on the shopping cart, which upright structure may be located between the legs of the child when the child is in the shopping cart child seat. The restraint may be moveably fastened to the child seat or the shopping cart, so that the restraint can move toward and away the legs of the child in the child seat. For example, the restraint may be in the form of a cross bar that is fastened to the upright structure of the shopping cart. The one or more positions may be proximate or distal from a region of the child seat that receives the leg of the child. The cross bar may, for example, pivot, translate or slide between positions, and may move along the upright structure or along another path, such as a curved path. The configuration permits the cross bar to be moved toward or away from a leg of a child in the child seat.

The cross bar, upright structure, child seat or shopping cart may be provided with a retaining mechanism that permits the cross bar to be fixed in or freed from one or more positions. The retaining mechanism may be configured as a ratchet or one or more detents or a latch that resists movement of the cross bar away from the leg of the child even when a relatively large force is used to urge the cross bar in that direction. The retaining mechanism may be configured to permit movement of the cross bar toward the leg of the child with a relatively small urging force. A release for the retainer mechanism may be provided that, upon actuation, releases the ratchet and permits the cross bar to move toward or away from the leg of the child with a relatively small urging force.

The restraint in the above example may be fastened or attached to a gate of the shopping cart. The restraint may be fastened or attached to a portion of the shopping cart that pivots when the shopping cart is nested into another shopping cart, or a portion of the shopping cart that pivots when another shopping cart is nested into the shopping cart.

According to an example implementation, the child restraint is a safety device in the form of a transversal body that is upwardly and downwardly adjustable. The transversal body may be implemented as the above-mentioned cross bar or vice versa. The safety device may be used with a shopping cart that has leg openings in a child seat for receiving the legs of a child. The transversal body is positioned near a leg opening and lowered from an upper idle or stand-by position to a lower active securing position that is proximate with a leg of the child in the child seat. The transversal body restricts the leg opening for the leg of the child when moved to a lower active securing position. The transversal body is adjustable to be positioned in one of a number of lower active securing positions. The position in which the transversal body is placed to secure the leg of the child may be variable and releaseably fixed. The transversal body may be adjusted and fixed in a position to accommodate a thickness of the leg of the child, for example. The transversal body can thus be adjusted height-wise and be fixed at a set level.

According to an example, the child restraint has a frame that supports the transversal body. The frame may be implemented as the above-mentioned slide mechanism or vice versa. The frame is elongated and may be relatively thin and in the shape of a three-dimensional rectangle or rectangular cuboid. The frame may be implemented as part of or integral with a child seat or a device in which a child seat is located, such as a stroller or a shopping cart. The transversal body is mounted on the frame to permit positioning of the transversal body in multiple operative locations. The multiple locations may permit entry and exit of a child in the child seat, or may restrain the child in the child seat. The locations may be along the elongated dimension of the frame.

The transversal body may enclose the frame and/or be retained to the frame to permit a movable or adjustable relationship. For example, the transversal body may slide, pivot or translate with respect to the frame. In the case of a slide relationship, the frame may have a slot that cooperates with a projection on the transversal body to retain the transversal body on the frame while permitting the transversal body to slide on the frame. The frame may also be configured with components that permit attachment to a child seat. For example, a child seat in a wire frame shopping cart may have wires that extend between the legs of a child sitting in the child seat. The frame may have openings or recesses to receive the wires to permit the frame to be mounted to the child seat in the wire frame shopping cart. The frame may be configured to have any particularly desired mounting mechanism for a child seat, as long as the transversal body can move toward and move away from a leg of a child sitting in the child seat.

According to an example, the transversal body and/or the frame may include the retaining mechanism, which may be in the form of projections or teeth that act as detents that contribute to positioning the transversal body with respect to the frame at certain locations. Any type of structure or mechanism may be used to retain the transversal body in a certain position with respect to the frame, including the projections, teeth and detents mentioned above, as well as frictional retainers and resilient items, such as springs, and in any combination, and without limitation. In some implementations, the transversal body can be moved to different positions along the frame and secured in place using the teeth.

The frame may include an elongated rack, which may be formed as a projection or recess in or on the frame. The transversal body may include a structure that is complementary to the rack, and may be formed with a groove or slot, or as a protrusion, as the case may be, to cooperate with the rack. The frame may include one or more detent structures, such as projections, teeth and/or recesses that may be disposed on the rack, which function as stops or positioners for the transversal body on the frame. The detent structures are arranged and configured to cooperate with one or more complementary detent structures on the transversal body, which may be disposed on the structure that is complementary to the rack. The detent structure on the transversal body may include one or more projections, teeth and/or recesses, which may be complementary to the detent structures on the frame. The detent structures on the transversal body may engage or disengage with the detent structures on the frame. Upon engagement, the detent structure on the transversal body cooperates with the detent structure on the frame to retain the transversal body at a certain position on the frame. Upon disengagement, the detent structures on the transversal body and on the frame no longer cooperate, and the transversal body is free to move with respect to the frame.

The detent structures on the transversal body and/or the frame may be biased towards engagement. For example, a resilient member such as a spring may be employed to bias the detent structures on the transversal body and/or on the frame to engage with each other. The engagement may be established and maintained for a given height position setting using a spring, such as a leaf or helical spring, for example. The resilient member may be disposed within the transversal body, and may have actuators that are accessible externally to the transversal body. The actuators may be in the form of one or more levers that act against the resilient member to release the detent structures from engagement, thereby permitting the transversal body to move toward or away from a child seat area that receives a child's leg.

When the transversal body is moved to an operative position for restraining a child in the child seat, the thickness of the child's thighs may determine the position at which the transversal body is retained by the retaining mechanism. When the child is to be removed from the child seat, the actuator is actuated to release the retaining mechanism and the transversal body can be moved away from the child seat area that receives a child's leg.

According to an example, the transversal body is configured to, in at least one mode, move toward a restraining or securing position as a default or idle operation. For example, detents or teeth on the frame and/or the transversal body may be shaped to permit the transversal body to move with respect to the frame to the securing position with very little applied urging force, such as gravitational force. In one example implementation, the configuration of the transversal body and/or the frame functions as a ratchet, where very little force may be used to move the transversal body toward a securing position, but movement of the transversal body away from a securing position is strongly resisted. Alternatively, or in addition, the transversal body may be urged toward a securing position by movement of a transport device to which the transversal body is mounted. For example, as the transport device is moved, vibrations or jolts experienced by the transport device are transferred to the child restraint, which in turn vibrate or jolt the transversal body, causing the transversal body to descend toward a securing position.

When a child is positioned in the child seat, the transversal body in the above-described example may settle on the legs of the child without direct force applied by the child or caregiver. Accordingly, the child restraint can be configured to be passive, so that the device automatically moves to a securing position without directly applied force. A feature of the child restraint according to the above examples is that the caregiver may be prevented from placing the child in the child seat until the transversal body is moved from the securing position to the stand-by position. Once the child is placed in the child seat with the transversal body in the stand-by position, the caregiver or child may move the transversal body into a securing position proximate to the child's leg(s). The transversal body may also be left in the stand-by position with the child in the child seat, and the motion of the transport device may cause the transversal body to move to a securing position, such as by rotational or translational movement. Thus, the child restraint can be automatically or passively reset with each use, which, among other features, permits the usage of the child restraint to be customized to the child.

According to an example implementation, some distal positions of the transversal body from the child seat may include a feature to retain the transversal body more strongly than other positions. Such an implementation permits the transversal body to be retained in the stand-by or idle position. The transversal body may be retained in the stand-by position until a certain threshold of force is encountered to cause the transversal body to move to a securing position. Once the transversal body is urged out of the stand-by position, inertia may be used to permit the transversal body to continue to move to a securing position with minimal resistance from the detents or teeth interaction.

According to an example implementation, the release for the retaining mechanism may include one or move levers. The lever may pivot about a pivot point on the transversal body, with a first end of the lever accessible to a user to permit actuation of the lever, and a second end of the lever configured to engage or disengage with detent structures on the frame. A bias may be applied to the lever to urge the lever to engage with the detent structures. The bias may be provided by a resilient member such as a spring, which may be implemented as a leaf spring or helical spring. Actuation of the lever by the user may be against to the bias to pivot the lever and disengage the second end from the detent structures, thereby permitting the transversal body to move with respect to the frame. Thus, the user may actuate the release mechanism by urging the first end of the lever to pivot the lever on the transversal body to disengage the second end of the lever from the detent structure on the frame to permit the transversal body to move with respect to the frame. The urging force provided by the user in conjunction with the lever configuration overcomes the bias to permit the lever to pivot. When the user no longer actuates the release mechanism, or when the urging force is removed from the first end of the lever, the bias causes the lever to pivot back to a position where the second end of the lever engages with the detent structure, thereby fixing the transversal body in position with respect to the frame.

According to another example implementation, a locking mechanism is provided to lock the transversal body in place with respect to the frame. The locking mechanism may include a peg and a cooperating recess that engage to fix the position of the transversal body with respect to the frame. The peg may be located on the transversal body and/or the frame, and may be actuated to engage with a cooperating recess on the frame and/or the transversal body to fix the position of the transversal body with respect to the frame. Alternatively, or in addition, the recess may be actuated to engage with a cooperating peg on either of the transversal body or the frame. A number of recesses and/or pegs may be provided on the transversal body and/or frame to form a set of stops, which are configured to be actuated to lock or unlock the position of the transversal body with respect to the frame. The stops may be arranged along a length of the transversal body and/or frame, so that the transversal body can be moved with respect to the frame and a peg can engage a recess at different positions along the frame.

According to an example, the locking mechanism, including the peg and/or recess, may be implemented with a detent function or latching function, or any configuration that permits the position of the transversal body to be releaseably fixed with respect to the frame. When the locking mechanism is configured as a peg that can be actuated to engage one or more of a number of recesses, the user can position the transversal arm with respect to the frame and actuate the peg to fix the relative position of the transversal arm and the frame.

According to an example, the locking mechanism may cooperate with the retaining mechanism to lock the transversal body in position with respect to the frame. The locking mechanism can be implemented as the peg and recess and can be configured to cooperate with the retaining mechanism. The retaining mechanism may resist movement of the transversal body away from an area of the child seat that receives a leg of the child. The locking mechanism may be configured to resist movement of the transversal body toward the area of the child seat that receives the leg of the child. Together, the locking mechanism and the retaining mechanism fix the transversal body in position with respect to the frame by the locking mechanism preventing the transversal body from moving toward the leg area of the child seat and by the retaining mechanism preventing the transversal body from moving away from the leg area.

According to an example, actuation of the release for the retaining mechanism may also cause the locking mechanism to be unlocked. The lever in the release may include a projection that actuates the locking mechanism to unlock the locking mechanism, such as by separating the peg and the recess so that they no longer engage or cooperate to fix the position of the transversal arm with respect to the frame. Alternatively, or in addition, the release may be actuated to permit the transversal body to move relative to the frame, and such movement may separate the peg and the recess so that they no longer cooperate. In this or other examples, the peg and recess may be shaped so that they cooperate to prevent movement of the transversal body toward the leg area of the child seat, and cause the locking mechanism to unlock when the transversal body is moved away from the leg area of the child seat. The shape and configuration of the peg and recess may include a ramp or inclined surface where the peg and recess engage. Movement of the transversal body away from the leg area may cause the peg and/or the recess to slide along the inclined surface to cause the peg and/or the recess to separate from each other so that they no longer cooperate. The locking mechanism may be configured to stay in a given state until actuated to be locked or unlocked.

BRIEF DESCRIPTION OF THE SEVERAL VIEWS OF THE DRAWINGS

The disclosure is described in greater detail below, with reference to the accompanying drawings, in which.

DETAILED DESCRIPTION

The disclosures of U.S. Pat. No. 7,887,067, issued Feb. 15, 2011, entitled "CHILD SAFETY DEVICE FOR CHILD SEAT," U.S. Pat. No. 6,832,767, issued Dec. 21, 2004, entitled "DEVICE FOR CHILD SEAT IN A SHOPPER TROLLEY" and U.S. Provisional Patent Application No. 62/174,433, filed Jun. 11, 2015, entitled "CHILD RESTRAINT FOR CHILD SEAT" are hereby incorporated herein in their entirety by reference.

Figure 1:
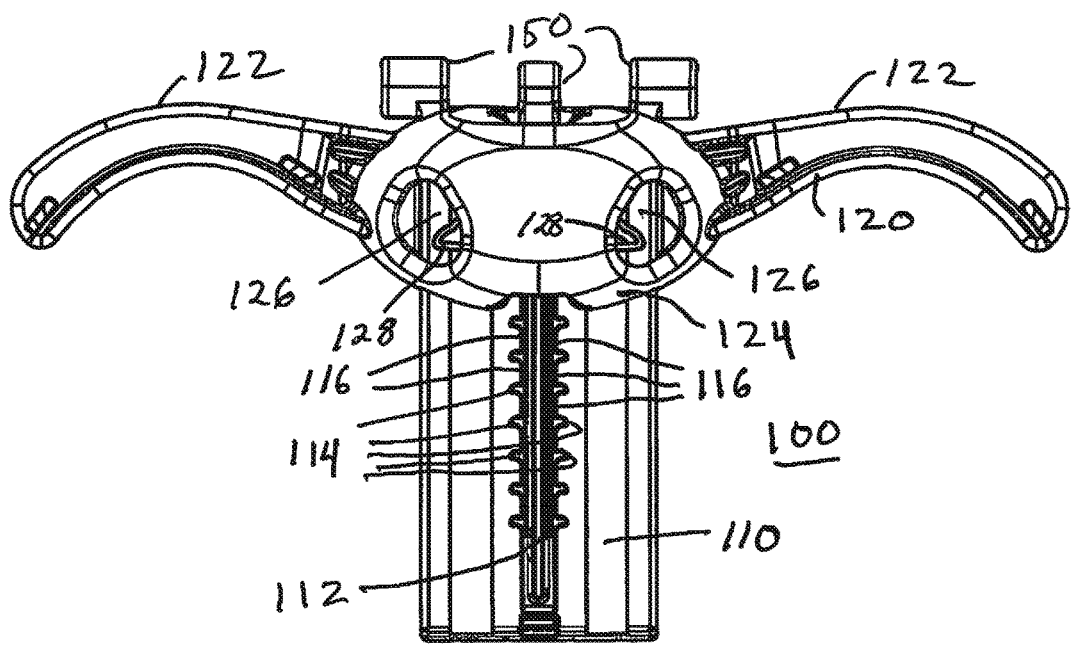
FIG. 1 is a front elevation view of an example implementation.

Referring to FIG. 1, a restraint 100 for a child seat is illustrated. Restraint 100 includes a slide 110 and a transversal body 120 that can move along slide 110. Transversal body 120 includes crossbars 122 that are shaped and arranged to restrain the leg of a child sitting in a child seat (not shown) in an active or engaged position. Transversal body 120 includes a housing 124 and that surrounds a portion of slide 110. Housing 124 includes openings 126 that permit access to levers 128. Levers 128 are part of a retaining mechanism 102 used to retain transversal body 120 in a certain position on slide 110. In operation, levers 128 can be actuated to release retaining mechanism 102 to permit transversal body 120 to be moved along slide 110.

Slide 110 includes a rack 112 that is elongated along a longitudinal axis of slide 110. Rack 112 includes detent structures 114 that are in the form of teeth spaced along rack 112. Detent structures 114 interact with retaining mechanism 102 located in housing 124 to contribute to retaining transversal body 120 in a given position along slide 110.

Figure 2:
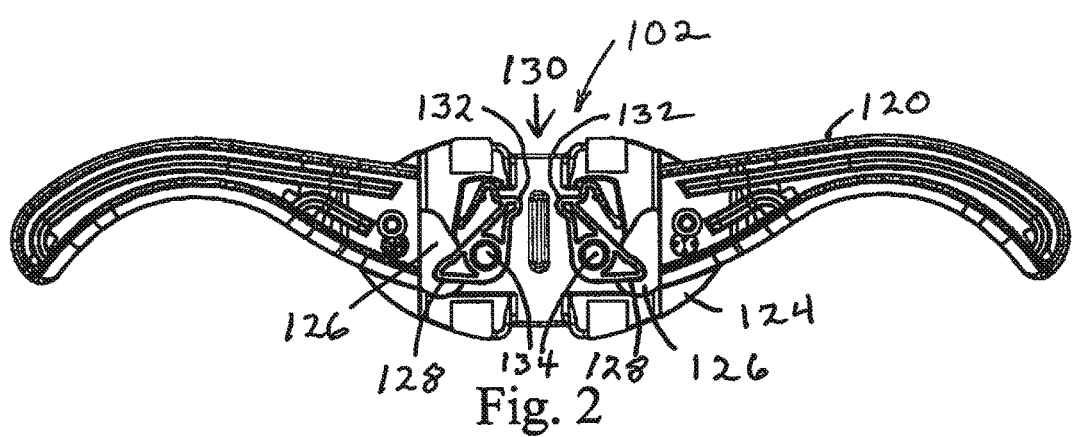
FIG. 2 is a rear elevation view of a transversal body according to an example implementation.

Referring now to FIG. 2, transversal body 120 is illustrated separately from slide 110 (FIG. 1). A portion of housing 124 is shown from a rear perspective, including openings 126 and levers 128. Housing 124 includes a channel 130 that is configured to receive and cooperate with rack 112 (FIG. 1). Levers 128 include protrusions 132 that can protrude into channel 130. Protrusions 132 interact with detent structures 114 when track 112 is received in channel 130. Levers 128 can pivot about pivot points 134. Levers 128 can be accessed and actuated via openings 126. Actuation of levers 128 can be achieved with an individual inserting base, and finger into respective openings 126 and applying a pinching force to both levers 128 simultaneously. As levers 128 are actuated, they pivot about pivot points 134, causing protrusions 132 to move out of channel 130. As protrusions 132 move out of channel 130, they disengage from detent structures 114 on rack 112 situated in channel 130. Once protrusions 130 disengage from detent structures 114, transversal body 120 is free to move along slide 110.

Figure 3:
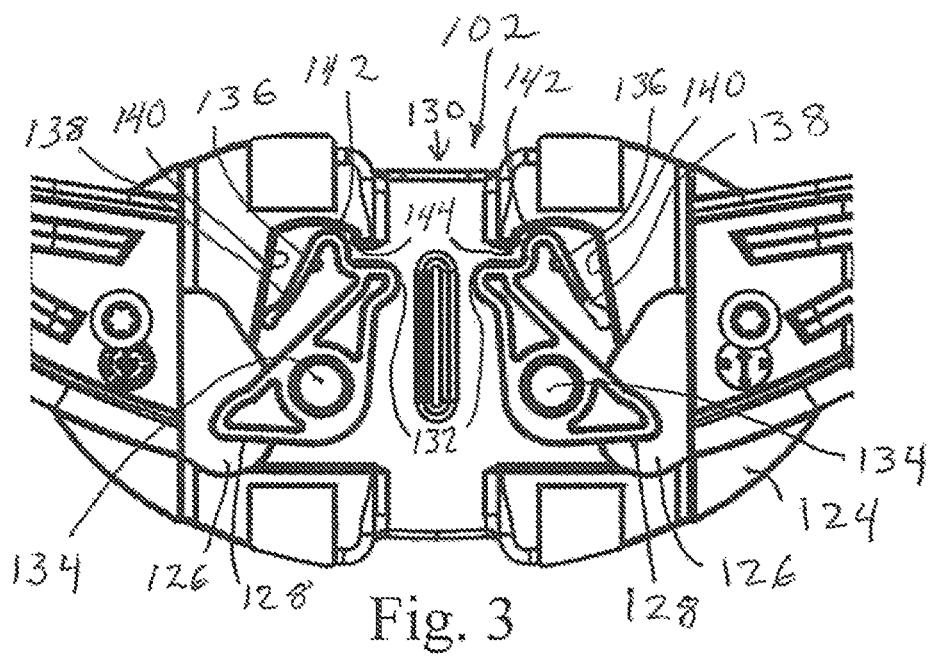
FIG. 3 is a rear elevation view of a portion of a retaining mechanism according to an example implementation.

Referring also to FIG. 3, resilient members 136 are mechanically coupled to levers 128, such as by being integral or being mechanically attached. Resilient members 136 each include an elongated portion 138 that operates like a leaf spring. Portions 138 each abut a wall 140 inside housing 124, and resiliently resist movement of levers 128. Accordingly, levers 128 are biased to the position illustrated in FIG. 3 by resilient members 136. Actuation of levers 128 to pivot about pivot points 134 causes resilient members 136 to resiliently deform and compresses as portions 138 abut and slide along walls 140. In the absence of an actuating force, levers 128 are biased into the position shown in FIG. 3 by resilient members 136. Levers 128 are stopped from further movement by stops 144 abutting curved portions 142 of resilient members 136. Portions 138 of resilient members 136 engage walls 140 to maintain a bias when levers 128 are stopped from further rotation by stops 144. With this configuration, levers 128 offer immediate resistance to actuation, since resilient members 136 are loaded with an urging force that is maintained by portions 142 abutting stops 144 while portions 138 are under load against walls 140. As levers 128 are actuated, portions 138 slide against walls 140 and portions 142 move away from stops 144 to retract protrusions 132 from channel 130.

Although levers 128 are illustrated as being subject to a bias in a non-actuated position, they may be configured to be free to rotate without a bias when unactuated. For example, portion 138 need not contact or abut wall 144 for one or both of levers 128 in a non-actuated or idle position, so that levers 128 have some mechanical play in their operation.

Figure 4:
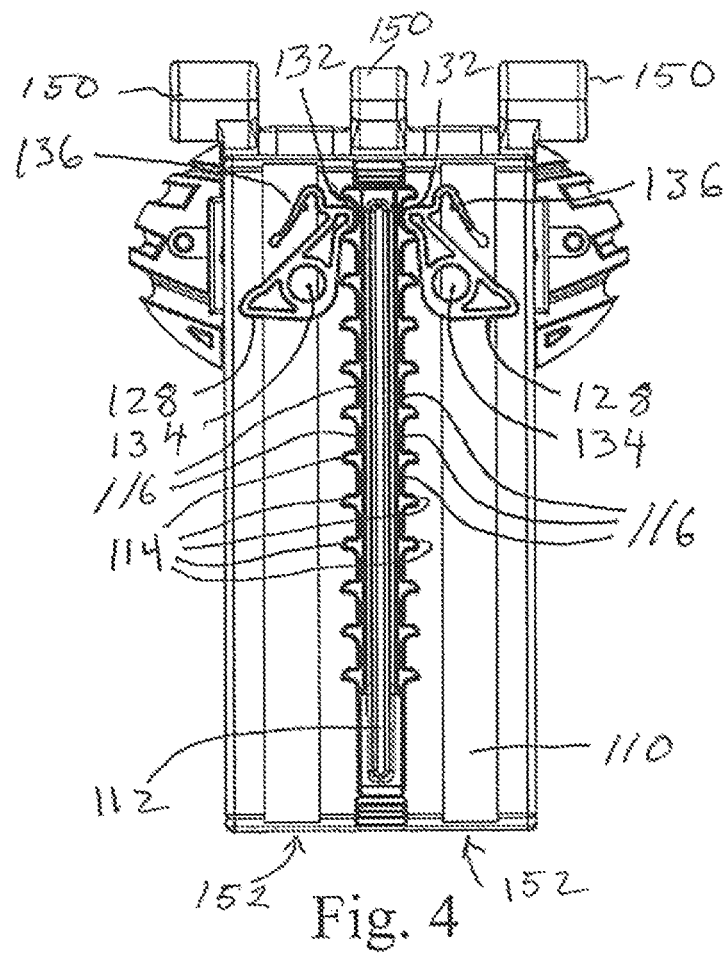
FIG. 4 is a front elevation view of a slide including components of according to an example implementation.

Referring to FIG. 4, slide 110 is illustrated with levers 128 interacting with rack 112. Levers 128 are illustrated by themselves, without showing their mounting in housing 124 for the sake of clarity. When levers 128 are in a non-actuated state, protrusions 132 cooperate with detent structures 114 and recesses 116 on rack 112. Protrusions 132 abut detent structures 114 to resist movement of transversal body 120, to which levers 128 are mounted via housing 124. The configuration of levers 128 strongly resists movement of transversal body 120 in an upward direction along slide 110, and weakly resists movement of transversal body 120 in a downward direction along slide 110.

When transversal body 120 is urged in an upward direction while levers 128 remain unactuated, the shape and location of detent structures 114 and recesses 116 contribute to urging protrusions 132 into recesses 116, thereby increasing the resistance to movement in an upward direction. When transversal body 120 is urged in a downward direction while levers 128 remain unactuated, detent structures 114 slide along projections 132, resulting in an urging force against the bias of resilient members 136. The urging force tends to move projections 132 out of recesses 116 as levers 128 pivot in in a direction to move projections 132 out of channel 130. As levers 128 pivot, projection 132 is freed from being blocked or stopped by detent structures 114 and/or recesses 116 to permit transversal body 120 to move downward with respect to slide 110.

As transversal body 120 moves downward along slide 110, the bias provided by resilient members 136 urges projections 132 into a next recess 116. Accordingly, transversal body 120 can move downward along slide 110 by overcoming the relatively small resistance provided by detent structures 114 urging levers 128 to pivot against the bias provided by resilient members 136. In contrast, movement of transversal body 120 in an upward direction is strongly resisted by the engagement of protrusions 132 with recesses 116 and detent structures 114. This engagement is reinforced as transversal body 120 is urged upward, since such an urging force tends to drive protrusions 132 more strongly into recesses 116, causing upward movement to be blocked by detent structures 114.

When levers 128 are non-actuated, transversal body 120 is more easily urged in a downward direction than in an upward direction, as discussed above. Levers 128 maybe actuated by application of a force to levers 128 to cause them to pivot against the bias provided by resilient members 136. As levers 128 pivot upon being actuated, projections 132 are withdrawn from recesses 116, and clear detent structures 114. Accordingly, actuation of levers 128 causes projections 132 to be released from mechanical interference with recesses 116 or detent structures 114. In such a released state, transversal body 120 is free to move along slide 110 without interference or any significant resistance.

In operation, restraint 100 is mounted to a child seat with openings 126 facing inwardly or outwardly, i.e., toward or away from the child seat. Mounting elements 150 may be formed as hooks or clamps that may be used to mount restraint 100 to the child seat or to the device hosting the child seat. In addition, or alternatively, slide 110 may include internal openings or slots 152 that may be used to mount restraint 100 to a child seat or to the device hosting the child seat. Transversal body 120 is set to an upward or idle position near a top extent of slide 110 by actuating levers 128 to release protrusions 132 from detent structures 114 and recesses 116 to permit transversal body 120 to freely move along slide 110. With transversal body 120 in an upward or idle position, a child may be placed in the child seat without being obstructed by transversal body 120.

With the child in the child seat, transversal body 120 may be moved downward by applying a downward urging force to transversal body 120, without the need to actuate levers 128. The urging force applied to move transversal body 120 downward is relatively small. As transversal body 120 moves closer to a child's leg, the child is restrained in the child seat. Transversal body 120 resists upward movement, owing to the interaction of protrusions 132 on levers 128 with recesses 116 and detent structures 114. Accordingly, restraint 100 can be engaged with a child's leg relatively easily, but strongly resists disengagement in the absence of actuation of levers 128.

Disengagement of restraint 100 from a child's leg can be achieved by actuating levers 128 to permit transversal body 120 to move along slide 110 without obstruction. When levers 128 are actuated, protrusions 132 disengage from detent structures 114 and recesses 116, and transversal body 120 can be raised to a top or idle position on slide 110. With transversal body 120 in a top or idle position, the child can be easily placed in or removed from the child seat without interference from restraint 100.

Restraint 100 may be placed on a child seat for a shopping cart without interfering with the nesting capability of the shopping cart. For example, restraint 100 may be mounted to a structure in the child seat located between the child's legs. Such a mounting location for restraint 100 does not interfere with collapse of the child seat or pivoting of the gate during shopping cart nesting operations. In addition, the location of restraint 100 on a child's seat for a shopping cart may permit transversal body 120 to be reset when shopping carts are nested. For example, a first shopping cart nested into a second shopping cart may contact and urge transversal body 120 into a lower position on slide 110. When in such a lower or reset position, a child may be prevented by restraint 100 from being place in the child seat. This feature prompts the user to release and raise transversal body 120 to an upward or idle position to permit the child to be placed in the child seat without interference. According to this feature, restraint 100 is made available and ready with each use to restrain the child, thus providing passive restraint functionality.

In addition to being actively lowered by a user to restrain a child in the child seat, transversal body 120 may also be activated or reset by the movement of a hosting device to which it is mounted. For example, transversal body 120 may move downwardly without levers 128 being actuated as a result of motion and/or oscillation of the hosting device. In the case of a shopping cart, transversal body 120 may move downwardly upon overcoming the relatively low level of resistance provided by resilient members 136 urging protrusions 132 into recesses 116. This low level of resistance may be overcome by the shopping cart being put into motion and subjected to relatively mild impacts or oscillations communicated through the shopping cart wheels being driven over slightly bumpy surfaces as may be encountered with concrete floors or asphalt parking lots or roadways. Accordingly, restraint 100 may be used by a caregiver for a child being placed in the child seat by actuating levers 128, raising transversal body 120 to a sufficient level to permit entry of the child in the child seat and then placing the child in the child seat. With the child in the child seat, and the shopping cart in motion, transversal body 120 can overcome the resistance to downward motion discussed above, and moved downward to a position that restrains one or more legs of the child in the child seat.

The relatively low level of resistance to downward motion of transversal body 120 permits transversal body 120 to be reset to a lower position with ordinary use. For example, when restraint 100 is used on a shopping cart, the nesting and handling of shopping carts as a group can provide sufficient energy to overcome the resistance to downward motion for transversal body 120, so that transversal body 120 can move downward to a lower position with respect to the child seat in a shopping cart. In this way, restraint 100 is reset for another use by a caregiver for a child to be placed in the child seat. With transversal body 120 moved to a lower position with respect to the child seat, entry of a child into the child seat is obstructed by transversal body 120. Accordingly, a caregiver for a child may be induced to raise transversal body 120 to a higher position by actuating levers 128 before placing a child in the child seat. Once the child is placed in the child seat, transversal body 120 can be lowered as discussed above.

Although restraint 100 is described and illustrated as having two crossbars 122, two levers 128 and two sets of detent structures 114 and recesses 116, fewer or more of these components may be used. For example, restraint 100 may be configured to use a single crossbar 122 to restraint a single leg of a child in a child seat. In addition, or alternatively, crossbars 122 may pivot or otherwise translate with respect to housing 124 to function as a child seat restraint and/or obtain additional restraint or customized fit for a child. Housing 124 can be provided with a rotary ratchet mechanism, for example, which may permit a crossbar 122 to pivot downward with a relatively small amount of urging force without the actuation of a release mechanism, but strongly resist pivoting upward unless the rotary ratchet mechanism is released.

According to an example implementation, some distal positions of transversal body 120 from the child seat may include a feature to retain transversal body 120 more strongly than other positions. Such an implementation permits transversal body 120 to be retained in a stand-by or idle position near a top of its range of motion. Transversal body 120 may be retained in the stand-by position until a certain threshold of force is encountered to cause transversal body 120 to move toward the leg area of the child seat or a securing position. Once transversal body 120 is urged out of the stand-by position, inertia may be used to permit the transversal body to continue to move to a securing position with minimal resistance from detent structures 114. According to this feature, one or more top-most detent structures 114 may be enlarged, and/or one or more top-most recesses 116 may be deepened, such that the threshold force for overcoming the bias of resilient members 136 is greater than with other, lower detent structures 114 or recesses 116. This feature permits transversal body 120 to be placed in the stand-by position near a top of its range of motion, and maintained there more readily than in other, lower positions with respect to downward motion. As such, transversal body 120 is more likely to stay in the stand-by position while a child is being placed in the child seat. This configuration contributes to keeping transversal body 120 from dropping and interfering with or obstructing the placement of the child in the child seat. Once the child is placed in the child seat, transversal body 120 can be urged downward to easily overcome the greater threshold for movement near the top of its range that is imposed by the enlarged instances of the one or more top-most detent structures 114 or the deepened instances of the one or more top-most recesses 116. Once transversal body 120 passes the point where projections 132 interact with enlarged detent structures 114 and/or deepened recesses 116, resistance to downward motion of transversal body 120 decreases, so that transversal body 120 can be urged downward with a relatively small applied force, such as gravity or forces applied by motion of the child seat to which restraint 100 is coupled.

Figure 5:
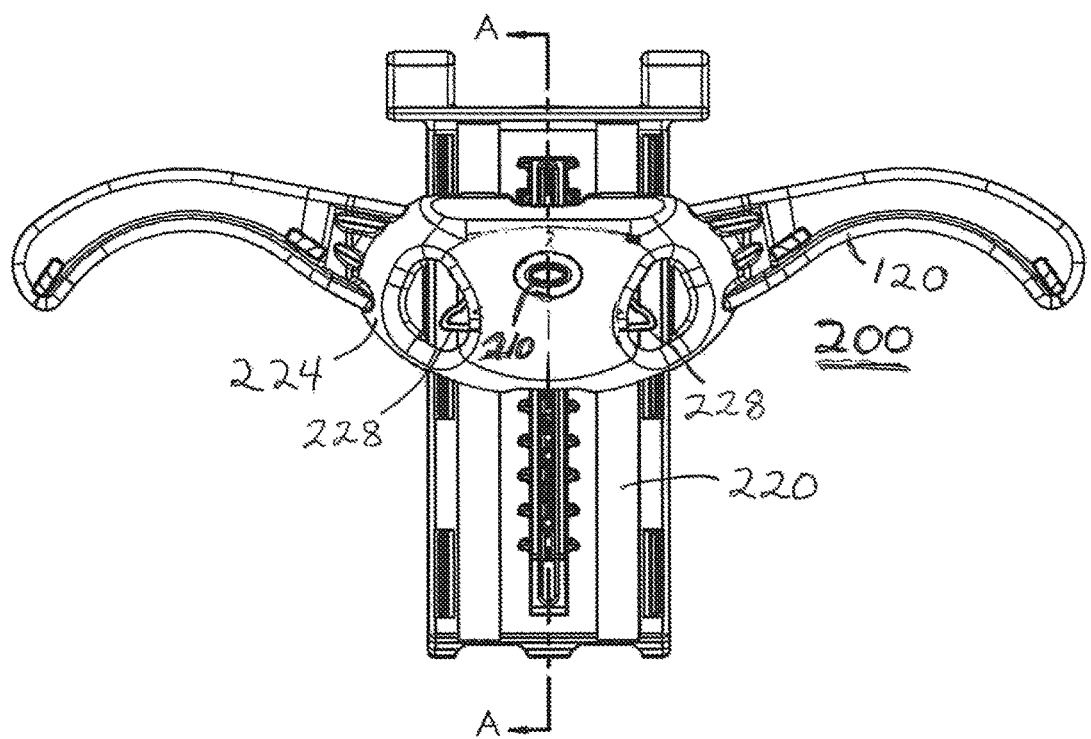
FIG. 5 is a front elevation view of an example implementation.

Referring now to FIG. 5, an example embodiment of a restraint 200 is illustrated with a locking feature. Restraint 200 may be implemented with restraint 100, and all relevant designators are maintained the same as with restraint 100. A locking mechanism 210 is provided in a housing 224 to lock transversal body 120 in place with respect to a frame 220.

Figure 6:
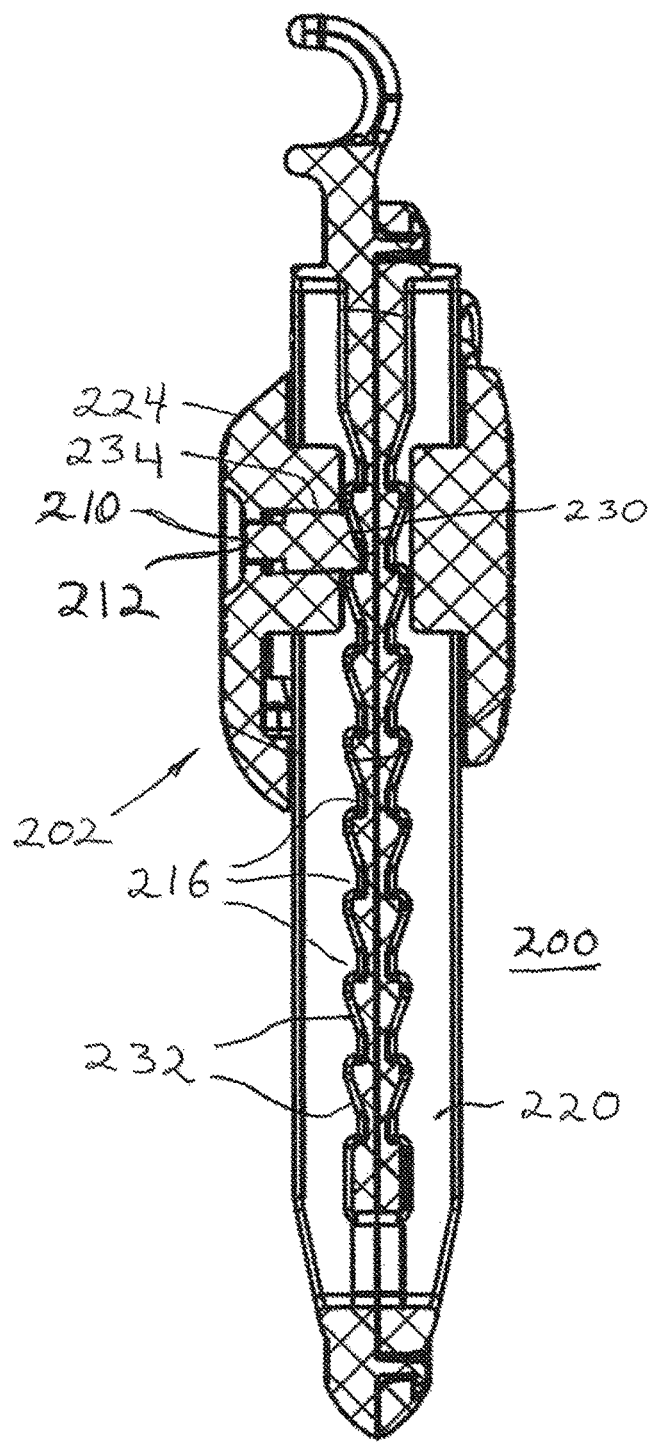
FIG. 6 is a cross-sectional elevation view of the example implementation of FIG. 5 taken along section A-A.

Referring to FIG. 6, locking mechanism 210 may include a peg 212 and a cooperating recess 216 that engage to fix the position of transversal body 120 with respect to frame 220. In other example implementations, peg 212 may be located in housing 224 and/or frame 220, and may be actuated to engage with a cooperating recess 216 on frame 220 and/or housing 224 to fix the position of transversal body 120 with respect to frame 220. Alternatively, or in addition, recess 216 may be actuated to engage with a cooperating peg 210 on either of housing 224 or frame 220. A number of recesses 216 and/or pegs 212 may be provided on transversal body 120, housing 224 and/or frame 220 to form a set of stops, which are configured to be actuated to lock or unlock the position of transversal body 120 with respect to frame 220. The stops may be arranged along a length of transversal body 120 and/or frame 220, so that transversal body 120 can be moved with respect to frame 220 and peg 212 can engage recess 216 at different positions along frame 220.

Locking mechanism 210, including peg 212 and/or recess 216, may be implemented with a detent function or latching function, or any configuration that permits the position of transversal body 120 to be releaseably fixed with respect to frame 220. When locking mechanism 210 is configured as peg 212 that can be actuated to engage one or more of a number of recesses 216, the user can position transversal body 120 with respect to frame 220 and actuate peg 212 to fix the relative position of transversal body 120 and frame 220.

Locking mechanism 210 may cooperate with a retaining mechanism 202 to lock transversal body 120 in position with respect to frame 220. Locking mechanism 210 can be implemented as peg 212 and recess 216 and can be configured to cooperate with retaining mechanism 202. Retaining mechanism 202 may resist movement of transversal body 120 away from an area of the child seat that receives a leg of the child. Locking mechanism 210 may be configured to resist movement of transversal body 120 toward the area of the child seat that receives the leg of the child. Together, locking mechanism 210 and retaining mechanism 202 fix transversal body 120 in position with respect to frame 220 by locking mechanism 210 preventing transversal body 120 from moving toward the leg area of the child seat and by retaining mechanism 202 preventing transversal body 120 from moving away from the leg area.

Actuation of levers 228 can release retaining mechanism 202 and may also cause locking mechanism 210 to be unlocked. Levers 228 in housing 224 may include a projection (not shown) that actuates locking mechanism 210 to unlock locking mechanism 210, such as by separating peg 212 and recess 216 so that they no longer engage or cooperate to fix the position of transversal body 120 with respect to frame 220. Alternatively, or in addition, levers 228 may be actuated to permit housing 224 and transversal body 120 to move relative to frame 220, and such movement may separate peg 212 and recess 216 so that they no longer cooperate. In this or other examples, peg 212 and recess 216 are shaped so that they cooperate to prevent movement of transversal body 120 toward the leg area of the child seat, and cause locking mechanism 210 to unlock when transversal body 120 is moved away from the leg area of the child seat. The shape and configuration of peg 212 and recess 216 include an inclined surface 230, 232, respectively, where peg 212 and recess 216 engage. Movement of transversal body 120 away from the leg area may cause peg 212 and/or recess 216 to slide along inclined surface 230, 232 to cause peg 212 and/or recess 232 to separate from each other so that they no longer cooperate.

Locking mechanism 210 may be configured to stay in a given state until actuated to be locked or unlocked. For example, peg 212 may be configured to frictionally engage surrounding walls 234 to resist movement in the absence of an urging force. In such a configuration, when peg 212 is placed in an unlocked position that does not engage or cooperate with recess 216, the frictional relationship with walls 234 contribute to maintaining peg 212 in such an unlocked position and state. When peg 212 is actuated to lock the position of housing 224 and transversal body 120 in relation to frame 220, the frictional relationship with walls 234 tends to maintain peg 212 in such a locked position.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

What is claimed is:

1. A restraint device for restraining a child occupant of a child seat, comprising:
   an adjustable restraint member being located above and that extends in a same direction as a front edge of the child seat and movably positionable in a downward and upward direction respectively toward and away from the front edge;
   a retaining element for retaining the restraint member in a plurality of positions along a path of movement, the retaining element being configured to permit the restraint member to move in the downward direction with an application of a first amount of force and to resist movement in the upward direction upon application of a second amount of force that is greater than the first amount of force;
   a position in the plurality of positions near a top of the path of movement, the position being configured with a retaining component that resists movement of the restraint member in the downward direction with a third amount of force that is less than the second amount of force and greater than the first amount of force; and
   a release mechanism coupled to the retaining element and configured to be actuated to free the restraint member from being retained at a position along the path of movement.

2. The restraint device according to claim 1, further comprising:
   a mounting frame configured to attach to a structure on or near the child seat; and
   the retaining element being located on one or more of the restraint member or the mounting frame.

3. The restraint device according to claim 2, wherein the mounting frame is configured to support the restraint member and to permit the restraint member to move in the downward and upward direction.

4. The restraint device according to claim 2, further comprising a slide on the mounting frame that supports the restraint member and is cooperative with the restraint member to permit the restraint member to slide in the downward and upward direction along the slide.

5. The restraint device according to claim 2, wherein the retaining element further comprises:
   a plurality of retaining components on the mounting frame aligned in the downward and upward direction; and
   at least one complementary retaining component on the restraint member configured to cooperate with at least one of the retaining components on the mounting frame to fix the restraint member in a position relative to the mounting frame.

6. The restraint device according to claim 5, wherein:
   the retaining components comprise one of a plurality of projections or a plurality of recesses; and
   the at least one complementary retaining component comprises at least another of a recess or a projection.

7. The restraint device according to claim 5, wherein the retaining element further comprises a bias element configured to urge at least one retaining component or the at least one complementary retaining component toward each other to engage to fix the restraint member in a position relative to the mounting frame.

8. The restraint device according to claim 7, wherein the at least one complementary retaining component is configured to index along the retaining components to permit movement of the restraint member in the downward and upward direction.

9. The restraint device according to claim 8, wherein the plurality of retaining components are shaped to permit the at least one complementary retaining component to index more easily in the downward direction than in the upward direction.

10. The restraint device according to claim 1, further comprising a release mechanism coupled to the retaining element and configured to be actuated to free the restraint member from being retained at a position along the path of movement.

11. The restraint device according to claim 1, further comprising a locking mechanism coupled to the retaining element and configured to contribute to locking the restraint member in one of the plurality of positions.

12. The restraint device according to claim 11, further comprising:
   a release mechanism coupled to the retaining element and configured to be actuated to free the restraint member from being retained at a position along the path of movement; and
   the release mechanism being configured to contribute to actuating the locking mechanism to unlock the restraint member from the one of the plurality of positions when the release mechanism is actuated.

13. A restraint device for restraining a child occupant of a child seat, comprising:
   an adjustable restraint member being located above and that extends in a same direction as a front edge of the child seat and movably positionable in a downward and upward direction respectively toward and away from the front edge;
   a retaining element for retaining the restraint member in a plurality of positions along a range of movement in an upward and downward direction;
   a stand-by position in the plurality of positions near a top of the range of movement, the stand-by position being configured to retain the restraint member with greater resistance to movement in the downward direction than resistance to movement in the downward direction provided by positions below the stand-by position;

a release mechanism coupled to the retaining element to counter the retaining element to free the restraint member from being retained at a position along the range of movement; and wherein the retaining element retains the restraint member in one position of the plurality of positions with greater resistance to movement in the upward direction than with movement in the downward direction when the release mechanism is not actuated.

14. The restraint device according to claim 13, further comprising:
    a mounting frame configured to attach to a structure on or near the child seat; and
    the retaining element being located on one or more of the restraint member or the mounting frame.

15. The restraint device according to claim 14, wherein the retaining element further comprises:
    a plurality of retaining components on the mounting frame aligned in the upward and downward direction; and
    at least one complementary retaining component on the restraint member configured to cooperate with at least one of the retaining components on the mounting frame to retain the restraint member in a position relative to the mounting frame.

16. The restraint device according to claim 15, wherein the retaining element further comprises a bias element configured to urge at least one retaining component or the at least one complementary retaining component toward each other to engage to retain the restraint member in a position relative to the mounting frame.

17. The restraint device according to claim 15, wherein the plurality of retaining components are shaped to permit the at least one complementary retaining component to index more easily in the downward direction than in the upward direction.

18. The restraint device according to claim 13, further comprising a locking mechanism coupled to the retaining element and configured to contribute to locking the restraint member in one of the plurality of positions.

19. A method of restraining a child in a child seat, comprising:
    providing a cross bar for restraining a leg of the child in the child seat;
    retaining the cross bar in a position that is distal or proximate to a front edge of the child seat using a releasable retaining mechanism;
    configuring the releasable retaining mechanism to permit the cross bar to be moved proximate to the front edge with a first degree of urging and to cause the cross bar to resist being moved distal to the front edge with a second degree of urging, the first degree of urging being less than the second degree of urging;
    configuring a stand-by position that is distal to the front edge of the child seat, the stand-by position being configured to retain the cross bar to resist being moved proximate to the front edge with a third degree of urging, the third degree of urging being greater than the first degree of urging and less than the second degree of urging; and
    moving the cross bar toward a front edge of the child seat from a distal position without releasing the releasable retaining mechanism.

* * * * *